Figure 1:
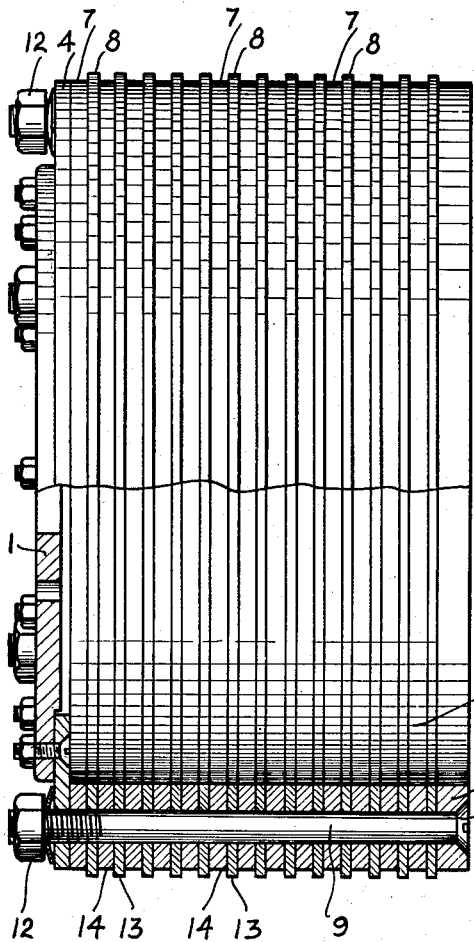

Dec. 8, 1953  A. C. DE YO  2,661,820
LAMINATED BRAKE DRUM
Filed Nov. 29, 1948

INVENTOR.
ARTHUR C. DEYO.
BY
Christy, Parmelee & Strickland
ATTORNEYS.

Patented Dec. 8, 1953

2,661,820

UNITED STATES PATENT OFFICE 2,661,820

LAMINATED BRAKE DRUM

Arthur C. De Yo, Shaler Township, Allegheny County, Pa., assignor, by direct and mesne assignments, to Multi Ring Brake Drum Corporation, Allison Park, Pa., a corporation of Pennsylvania Application November 29, 1948, Serial No. 62,534

5 Claims. (Cl. 188—218)

This invention relates to brake drums, and, more particularly, to an improved brake drum having special advantages for use on large trucks where considerable braking effort is required.

The braking force which may be developed by a given brake drum is to a large extent dependent upon the braking surface area presented by the drum to its brake shoe. In order to generate the braking force necessary to stop large trucks and trailer vehicles carrying heavy loads, it has been necessary to make the drums as large as structural limitations, such as the wheel diameter and the torsional forces and body parts limiting the axial length of the drum, will permit. Such drums are, in accordance with conventional practice, commonly formed of steel castings which are machined to size. In service, intense heat is developed when braking a heavy load and this heat frequently is sufficient to crack the casting forming the drum thereby necessitating its replacement and the replacement of surrounding parts of the brake mechanism and truck which may have been damaged as a result of the brake drum failure.

One of the principal objects of this invention is to provide an improved brake drum which will be found effective to reduce the size of a drum for a given braking effort and which will eliminate failure due to heat developed in service. To this end, this invention contemplates the provision of a laminated brake drum formed of a plurality of annular rings bolted together in concentric relation in such manner that they cooperate to form a laminated braking surface. In the preferred embodiment of the invention, alternate rings forming the laminated drum are steel and copper, the copper rings preferably having a depth in an axial direction less than the depth of the steel rings. The provision of the copper rings increases the heat conductivity of the drum and its ability to transfer heat generated at its braking surface to its outer surface where it may be dissipated in the atmosphere. The individual rings being separate from each other are not materially affected by the thermal expansion of other rings thereby eliminating failure of the drum by reason of internal stresses due to unequal thermal expansion in the various parts of the drum. In addition, the formation of the laminated drum from alternate copper and steel laminations provides a desirable effect on the braking surface.

Other objects and advantages of the invention will become apparent from the following description.

Figure 2:
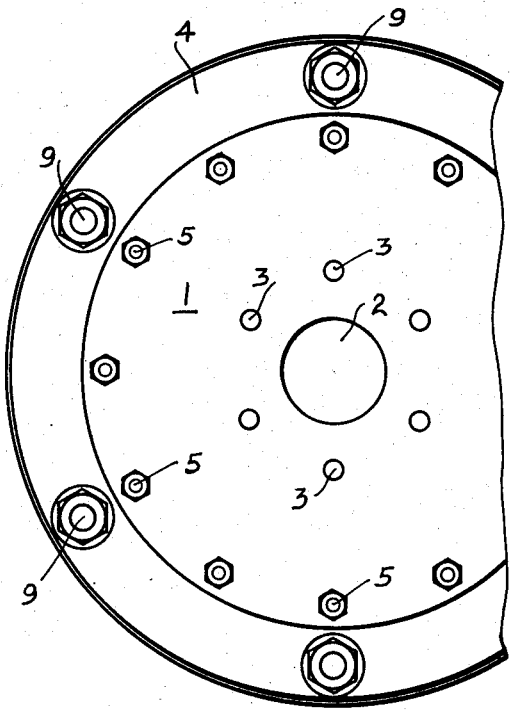

In the drawings, there is shown a preferred embodiment of the invention. In this showing:

Fig. 1 is a side elevational view of the invention, a part thereof being broken away and shown in vertical section; and Fig. 2 is an end elevational view of the structure shown in Fig. 1, a part thereof being broken away.

Referring to the drawings, the numeral 1 designates a supporting member or end plate having a central opening 2 for the reception of a vehicle wheel axle. The end plate 1 is provided with a plurality of openings 3 by which it may be bolted to the hub of a vehicle wheel. An annular mounting end plate 4 is secured to the plate 1 by a plurality of bolts 5.

The braking surface 6 of the drum is a laminated surface which is provided by a plurality of annular rings 7 and 8 arranged alternately, as best shown in Fig. 2. The rings 7 and 8 are preferably formed from sheet-metal by a stamping operation, or by other suitable fabricating operations, so that each of the rings have flat side surfaces in spaced parallel planes and inner and outer cylindrical surfaces, the inner cylindrical surfaces cooperating to form a braking surface in a mannier to be described. Each of the rings 7 and 8 is provided with a similar number of angularly spaced openings for the reception of mounting bolts 9. The bolts 9 operate to mount the rings 7 and 8 concentrically on the annular end plate 4. At the inner end of the drum, there is provided an annular end plate 10 having countersunk openings for the reception of bolt heads 11, as best shown in Fig. 1. The other ends of the bolts 9 are threaded for engagement with mounting nuts 12. When the nuts 12 are turned down on the bolts 9, the plate 10 will move inwardly to clamp the annular side surfaces of the rings 7 and 8 in tight abutting engagement with each other. The bolts 9 thus operate to mount the rings 7 and 8 in concentric relation on the plate 4 and end plate 1. In addition, the bolts 9 are effective to prevent rotation of the rings 7 and 8 with respect to each other.

In the preferred practice of the invention, the rings 7 are formed of steel and the rings 8 are formed of copper. Due to the high thermal conductivity of copper, the rings 8 will be effective to conduct heat rapidly away from the braking surface 6. The side surfaces of the rings 8 being clamped tightly in abutting engagement with the side surfaces of the rings 7, the copper rings 8 will also be effective to conduct heat away from the steel rings 7. In order to increase the dissipation of heat to the atmosphere, the copper rings 8 are provided with a greater radial depth than the steel rings 7 so that their cylindrical outer surfaces 13 are spaced outwardly from the cylindrical outer surfaces 14 of the steel rings 7. In this manner a greater area is provided by the radially projecting ends of the copper rings 8 for the dissipation of heat. The radially projecting ends of the copper rings 8 are in effect heat transferring fins on the outer surface of the brake drum.

From the foregoing, it will be apparent that there is provided a laminated brake drum in which the individual laminations are formed by the alternate annular rings 7 and 8. Attention is particularly invited to the fact that the bolts 9 operate to rigidly secure the individual laminations in concentric relation. However, the mounting of the laminations provided by the bolts 9 is such that thermal expansion of one of the rings is inoperative to affect the other rings or laminations. In other words, the individual laminations are free to expand and contract individually of each other. It will thus be seen that, by reason of the laminated structure, internal stresses effective to cause failure of the drum are not produced.

The opening in the rings 7 and 8 for the reception of the mounting bolts 9 provide sufficient play that the individual rings may expand and contract independently of each other. Attention is particularly invited to the mounting of the laminations 7 and 8 since such mounting represents a considerable departure from conventional brake drums in which the braking surface is provided by an integral structure. This mounting is also considerably different from brake drums wherein different parts thereof are integrally connected by welding. In brake drums in which the brake surface is provided by a single integral structure of two or more structures integrally welded together, unequal expansion or contraction of the drum is effective to set up internal stresses of considerable magnitude which at times result in failure of the drum. By providing a laminated brake drum in which the individual laminations are free to contract and expand independently of each other as described above, it will be seen that internal stresses which might otherwise result in failure of the drum are eliminated.

While I have illustrated and described one specific embodiment of my invention, it will be understood that this is merely by way of illustration, and that various changes and modifications may be made therein within the contemplation of my invention and under the scope of the following claims.

I claim:

1. A laminated cylindrical brake drum comprising a plurality of flat annular metal rings respectively having spaced annular side surfaces and inner and outer cylindrical surfaces positioned between said side surfaces, said rings being stacked concentrically with adjacent side surfaces of adjacent rings abutting and said inner cylindrical surfaces cooperating to form a smooth and continuous laminated cylindrical braking surface, said outer cylindrical surfaces of said rings being exposed and unobstructed so that heat generated at said inner cylindrical surfaces may be transmitted through said rings and dissipated directly to the atmosphere.

2. The invention defined in claim 1 characterized by several of said rings being formed of copper and the remainder being formed of a ferrous metal, each of said copper rings being positioned between two of said ferrous metal rings.

3. The invention defined in claim 2 characterized by said copper rings having a lesser axial dimension and a greater radial dimension than said ferrous metal rings whereby said copper rings provide cooling fins extending radially outwardly from the peripheries of said ferrous metal rings.

4. A laminated cylindrical brake drum comprising a plurality of flat annular metal rings respectively having spaced annular side surfaces and inner and outer cylindrical surfaces positioned between said side surfaces, said rings being stacked concentrically with adjacent side surfaces of adjacent rings abutting and said inner cylindrical surfaces cooperating to form a smooth and continuous laminated cylindrical braking surface, and mounting means securing said rings against displacement relative to each other, said outer cylindrical surfaces of said rings being exposed and unobstructed so that heat generated at said inner cylindrical surfaces may be transmitted through said rings and dissipated directly to the atmosphere.

5. A laminated cylindrical brake drum comprising a plurality of annular metal rings respectively having spaced annular side surfaces and inner and outer cylindrical surfaces positioned between said side surfaces, each of said rings having a plurality of openings therethrough for the reception of mounting bolts, and a plurality of bolts extending through said openings for mounting said rings concentrically and for applying an axial clamping force thereto to maintain adjacent side surfaces of adjacent rings in abutting relation and with their said inner cylindrical surfaces forming a continuous laminated braking surface, the said outer cylindrical surfaces of said rings being exposed and unobstructed so that heat generated at said inner cylindrical surfaces may be transmitted through said rings and dissipated directly to the atmosphere.

ARTHUR C. DE YO.

References Cited in the file of this patent

UNITED STATES PATENTS

| Number | Name | Date |
|---|---|---|
| 258,435 | King | May 23, 1882 |
| 315,213 | Allen | Apr. 7, 1885 |
| 380,384 | Crowell | Apr. 3, 1888 |
| 403,739 | Crowell | May 21, 1889 |
| 903,049 | Bonner | Nov. 3, 1908 |
| 1,812,834 | Scott | June 30, 1931 |
| 1,990,510 | Winkler | Feb. 12, 1935 |
| 2,092,421 | Morgan | Sept. 7, 1937 |
| 2,506,823 | Wyant | May 9, 1950 |
| 2,563,769 | Wyant | Aug. 7, 1951 |

FOREIGN PATENTS

| Number | Country | Date |
|---|---|---|
| 6,022 | Great Britain | 1896 |